US007327329B2

(12) United States Patent
Kobayashi et al.

(10) Patent No.: US 7,327,329 B2
(45) Date of Patent: Feb. 5, 2008

(54) DYNAMICALLY SELECTING EITHER FRAME RATE CONVERSION (FRC) OR PIXEL OVERDRIVE IN AN LCD PANEL BASED DISPLAY

(75) Inventors: Osamu Kobayashi, Los Altos, CA (US); Anders Frisk, Menlo Park, CA (US)

(73) Assignee: Genesis Microchip Inc., Santa Clara, CA (US)

( * ) Notice: Subject to any disclaimer, the term of this patent is extended or adjusted under 35 U.S.C. 154(b) by 721 days.

(21) Appl. No.: 10/902,898

(22) Filed: Jul. 29, 2004

(65) Prior Publication Data

US 2005/0162367 A1 Jul. 28, 2005

Related U.S. Application Data

(60) Provisional application No. 60/539,833, filed on Jan. 27, 2004.

(51) Int. Cl.
*G09G 5/00* (2006.01)
*H04N 5/14* (2006.01)

(52) U.S. Cl. .......................... 345/3.2; 345/87; 345/88; 348/699; 348/700; 348/701; 348/714; 348/715

(58) Field of Classification Search ................. 345/3.2, 345/87, 88, 214, 215; 348/699, 700, 701, 348/714, 715, 716
See application file for complete search history.

(56) References Cited

U.S. PATENT DOCUMENTS 5,387,941 A * 2/1995 Montgomery et al. ...... 348/473
6,316,974 B1 * 11/2001 Taraci et al. ................ 327/147
6,329,981 B1 * 12/2001 Lin et al. .................... 345/204
2002/0044151 A1 4/2002 Ijima et al.
2003/0095088 A1 5/2003 Ham
2003/0156092 A1 8/2003 Suzuki et al.
2004/0041745 A1 3/2004 Chen
2004/0130661 A1 * 7/2004 Jiang .......................... 348/459
2004/0189680 A1 9/2004 Feng et al.

OTHER PUBLICATIONS

European Search Report dated Mar. 30, 2006 from corresponding European Application No. EP 05 25 0340.

European Office Action dated Dec. 7, 2006 in corresponding EP Application No. 05250340.6.

* cited by examiner

*Primary Examiner*—Richard Hjerpe
*Assistant Examiner*—My-Chau T. Tran
(74) *Attorney, Agent, or Firm*—Beyer Weaver LLP

(57) ABSTRACT

In a liquid crystal display (LCD) panel based display, a method of dynamically selecting either frame rate conversion (FRC) or pixel voltage overdrive is disclosed. The method is carried out by performing the following operations. A video vertical refresh rate of an incoming video data stream is determined and based upon the determining, only one video data stream conditioning protocol from a number of available video data stream conditioning protocols is selected. The selected video data stream condition protocol is then applied to the video data stream.

19 Claims, 5 Drawing Sheets

DYNAMICALLY SELECTING EITHER FRAME RATE CONVERSION (FRC) OR PIXEL OVERDRIVE IN AN LCD PANEL BASED DISPLAY

CROSS REFERENCE TO RELATED APPLICATIONS

This patent application takes priority under 35 U.S.C. 119(e) to U.S. Provisional Patent Application No. 60/539,833 filed on Jan. 27, 2004 entitled "ENABLING EITHER FRC (FRAME REATE CONVERSION) OR OVERDRIVE (FOR LCD PANEL MOTION BLURRINESS REDUCTION" by Kobayashi and Frisk which is incorporated by reference in its entirety.

BACKGROUND

1. Field of the Invention

The invention relates to display devices. More specifically, the invention describes a memory resource efficient method, apparatus, and system for using driving LCD panel drive electronics.

2. Overview

Deterioration of image quality for moving images (such as reduced resolution and blurring) referred to as "ghosting" that is due primarily to the slower response time of liquid crystal is a common problem in LCD monitors. Since LCDs rely on the ability of the liquid crystal material to orient itself under the influence of an electric field, the viscous nature of the liquid crystal material causes a response delay that can be longer than the time between successive frames. Ghosting occurs when the luminance value for a frame immediately following any abrupt transitions between luminance levels (i.e., either a falling or a rising transition) deviates significantly from the target luminance value.

A popular technique for reducing or even eliminating these ghosting artifacts, referred to as LC pixel overdrive, is based upon providing an overdrive luminance value (corresponding to an overdrive pixel voltage) calculated to provide the target luminance within the specified frame. Implementation of these LC pixel overdrive techniques typically involves comparing the display data of a new frame to that display data of previous frame or frames. Based upon this comparison, the applied pixel voltage is adjusted such that the target luminance value (or a substantial portion, thereof) is achieved within the specified frame period. Common practice dictates that a frame buffer be used to store the display data of previous frame(s) that is then used to compare to the new frame data. A typical frame buffer can be on the order of a few Megabytes (3-5) in size having access times on the order of a few nanoseconds.

Currently, LCD panels operate in a range of vertical refresh frequency (in the range of approximately 50-60 Hz) that is limited due to many factors (such as the response time of the LC material and the fact that the line period must be of sufficient duration to enable adequate charging and discharging of LCD cells). However, PCs were developed for use with CRT type displays and are designed to generate a display image with a higher vertical refresh rate (such as 75 Hz and 85 Hz) in order to reduce flicker common to CRT technology. However, these higher refresh rates are both unnecessary and difficult to maintain for most LCD panels. Therefore these high refresh rates must be reduced for most LCD panels using any of a number of frame rate conversion (FRC) protocols such that an LCD panel can be used with any video source regardless of its native refresh rate. As with LC pixel overdrive, implementing currently available FRC protocols requires dedicated memory in the form of a frame buffer arranged to selectively store and read out the display data.

As described above, both FRC and overdrive require the LCD display controller have a frame buffer for data manipulation. Enabling both FRC and LC pixel overdrive simultaneously requires higher memory bandwidth than is required for enabling only one of them. Higher memory bandwidth results in higher implementation cost of both the LCD display controller and the frame buffer memory components.

Therefore, being able to selectively enable either FRC or LC pixel overdrive based upon an input vertical refresh rate is very desirable.

SUMMARY OF THE INVENTION

What is provided, therefore, is a memory efficient method, apparatus, and system suitable for implementation in Liquid Crystal Display (LCDs) that reduces a pixel element response time that enables the display of high quality fast motion images thereupon or provides necessary frame rate conversion.

In a liquid crystal display (LCD) panel based display, a method of dynamically selecting either frame rate conversion (FRC) or pixel voltage overdrive is disclosed. The method is carried out by performing the following operations. A video vertical refresh rate of an incoming video data stream is determined and based upon the determining, only one video data stream conditioning protocol from a number of available video data stream conditioning protocols is selected. The selected video data stream condition protocol is then applied to the video data stream.

In a preferred embodiment, the video data stream conditioning protocols include a LC pixel overdrive protocol for those situations where the native video data stream vertical refresh rate is less than or equal to a threshold value, such as 50 Hz, or 60 Hz, or 70 Hz, or whatever is deemed appropriate for the situation. For those situations where the native incoming vertical refresh rate is greater than, for example, 60 Hz, the native video data stream vertical refresh rate is reduced to approximately 60 Hz by way of a selected FRC protocol. Of course, the threshold values can be any value as are the desired frame rate values.

In another embodiment, an apparatus for dynamically selecting only one of a number of video conditioning protocols used to condition an incoming video data stream provided by a video source is disclosed. The apparatus includes a video refresh rate determinator unit coupled to the video source arranged to determine a native vertical refresh rate of the incoming video data stream, a selector unit coupled to the video refresh rate determinator unit arranged to select the only one video conditioning protocol based upon the native vertical refresh rate, and a number of video conditioning protocol units coupled to the selector unit, wherein only a video conditioning protocol unit associated with the selected video conditioning protocol is enabled, and a memory resource coupled to each of the video conditioning protocol units that is used to store video data used to implement the selected video conditioning protocol having a size and speed commensurate with providing the requisite memory resources for the selected video conditioning protocol.

In another embodiment of the invention, computer program product for dynamically selecting only one of a number of video conditioning protocols at a time thereby conserving an associated memory resource in a liquid crystal display (LCD) panel based display having a memory resource suitable for storing video data is disclosed. The computer program product includes computer code for determining a vertical refresh rate of an incoming video data stream, computer code for selecting only one video conditioning protocol from a number of available video conditioning protocols based upon the determining, computer code for storing video data associated with the selected video conditioning protocol in the memory resource, computer code for implementing the selected video conditioning protocol, and computer readable medium for storing the computer code.

DETAILED DESCRIPTION OF SELECTED EMBODIMENTS

Figure 1:
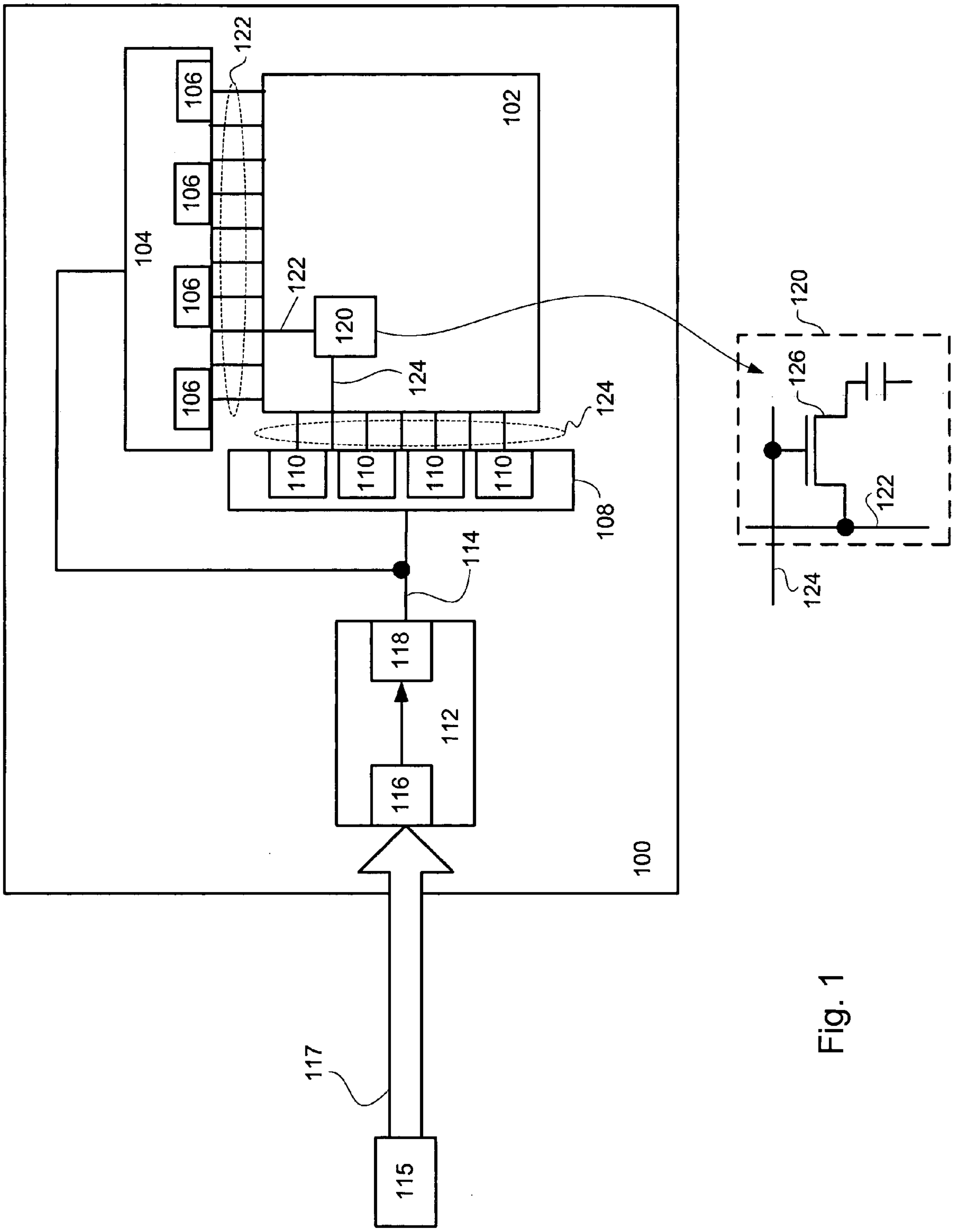
FIG. 1 is a block diagram showing an example of an active matrix liquid crystal display device suitable for use with any embodiment of the invention.

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

The invention relates to digital display devices and in particular, LCD panels used in both personal computer environments as well as consumer electronics. Although LCD panels have a number of advantages over currently available CRT displays, the fact that the image produced by the LCD panel relies upon the physical rearrangement of the LC material in the LCD cell limits the response time of the LCD cell. The limited response results in motion artifacts, referred to as ghosting, in those situations where fast motion results in large luminance transitions between video frames.

A popular technique for reducing or even eliminating these ghosting artifacts referred to as LC pixel overdrive uses substantial memory resources (usually in the form of a frame buffer on the order of few megabytes) to store the display data of previous frame(s) that is then used to compare to the new frame data. In conventional LCD panel designs, this same memory is used to concurrently provide any of a number of frame rate conversion (FRC) protocols (especially frame rate reduction) thereby allowing the LCD panel to interface with a wide variety of video sources regardless of the native vertical refresh rate.

However, since both FRC and LC pixel overdrive protocol and the LC pixel overdrive protocol require a frame buffer for data manipulation, enabling both FRC and LC pixel overdrive concurrently requires higher memory bandwidth than is required for enabling only one of them at a time. Higher memory bandwidth results in higher implementation cost of both the LCD display and the frame buffer memory components. Therefore, a memory resource efficient system, method, and apparatus where only one video compensation protocol (such as FRC or LC pixel overdrive) is active at a time thereby preserving valuable memory resources is described.

Accordingly, based upon the native vertical refresh rate of an incoming video stream, the native video refresh rate is either reduced by way of a FRC protocol when the native vertical refresh rate is greater than a predetermined threshold, or in the alternative, fast motion artifacts are reduced by way of an LC pixel overdrive protocol. In either case, the same memory resources (typically a frame buffer) is used of a size and speed suitable for implementing only one of the protocols at a time. In this way, the memory resources represented by the frame buffer is substantially reduced over that required if both the FRC protocol and the LC pixel overdrive protocol were enabled and operational concurrently.

The invention will now be described in terms of a representative LCD panel that incorporates an interface suitably arranged to implement the invention. It should be noted, however, that the following description is exemplary in nature and should therefore not be construed as limiting either the scope or intent of the invention.

FIG. 1 is a block diagram showing an example of an active matrix liquid crystal display device 100 suitable for use with any embodiment of the invention. The liquid crystal display device 100 includes a liquid crystal display panel 102, a data driver 104 that includes a number of data latches 106 suitable for storing image data, a gate driver 108 that includes gate driver logic circuits 110, a timing controller unit (also referred to as a TCON) 112 that provides a video signal 114 used to drive the data driver 104 and the gate driver 108. Typically, the TCON 112 is connected to a video source 115 (such as a personal computer or other such device) suitably arranged to output a video signal 117.

In the described embodiment, the TCON 112 includes compensation circuitry 116 (described in more detail below) coupled to a frame buffer 118 that, based upon a native vertical refresh rate of an incoming video signal, either compensates for motion artifacts caused by slow LC response time or reduces the native vertical refresh rate to a rate deemed suitable for the display device 100. The LCD panel 102 includes a number of picture elements 120 that are arranged in a matrix connected to the data driver 104 by way of a plurality of data bus lines 122 and a plurality of gate bus lines 124. In the described embodiment, these picture elements 120 take the form of a plurality of thin film transistors (TFTs) 126 that are connected between the data bus lines 122 and the gate bus lines 124. The data driver 104 outputs data signals (display data) to the data bus lines 122 while the gate driver 108 outputs a predetermined scanning signal to the gate bus lines 124 in sequence at timings which are in sync with a horizontal synchronizing signal. In this way, the TFTs 126 are turned ON when the predetermined scanning signal is supplied to the gate bus lines 124 to transmit the data signals, which are supplied to the data bus lines 122 and ultimately to selected ones of the picture elements 120.

During operation, the compensation circuit 116 determines a native vertical refresh rate of the incoming video signal 117. Based upon this determination, only one of a number of video compensation protocols are implemented. In those situations where the native vertical refresh rate is less than a predetermined threshold value (such as, for example, 60 Hz), the compensation circuit 116, in conjunction with the frame buffer 118, reduces any fast motion artifacts (such as ghosting) by applying a previously determined LC pixel overdrive protocol. One such LC pixel overdrive protocol reduces the effect of fast motion from one video frame to another by applying an overdrive pixel luminance value calculated to achieve the target pixel luminance value within the specified frame period.

Alternatively, in those cases where the compensation circuit 116 has determined that the native vertical refresh rate is greater than the predetermined threshold (such as 60 Hz), the vertical refresh rate of the incoming video signal 117 is reduced to that determined to be suitable for the LC display 100. It should be noted, however, that in this situation (as with the previously described situation whereby only LC pixel overdrive is enabled) the frame buffer 118 is only used to implement the enabled FRC protocol. In this way, the total memory resources required is substantially reduced in both size and speed over that which would be required if both LC pixel overdrive and FRC were enabled concurrently.

Figure 2:
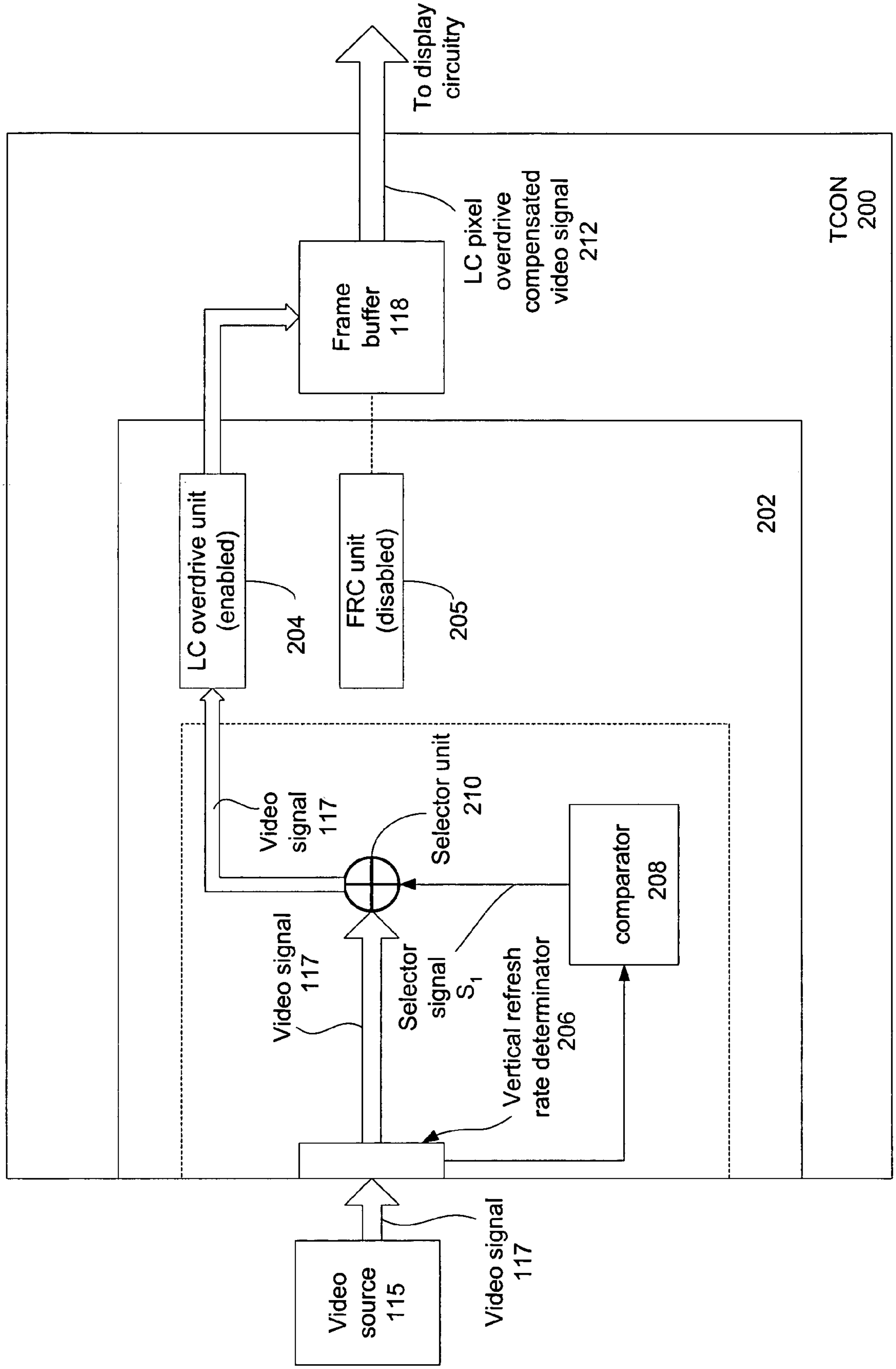
FIGS. 2 and 3 shows a representative timing controller (TCON) having a compensation circuit that provides either LC pixel overdrive compensation or FRC compensation in accordance with an embodiment of the invention.
Figure 3:
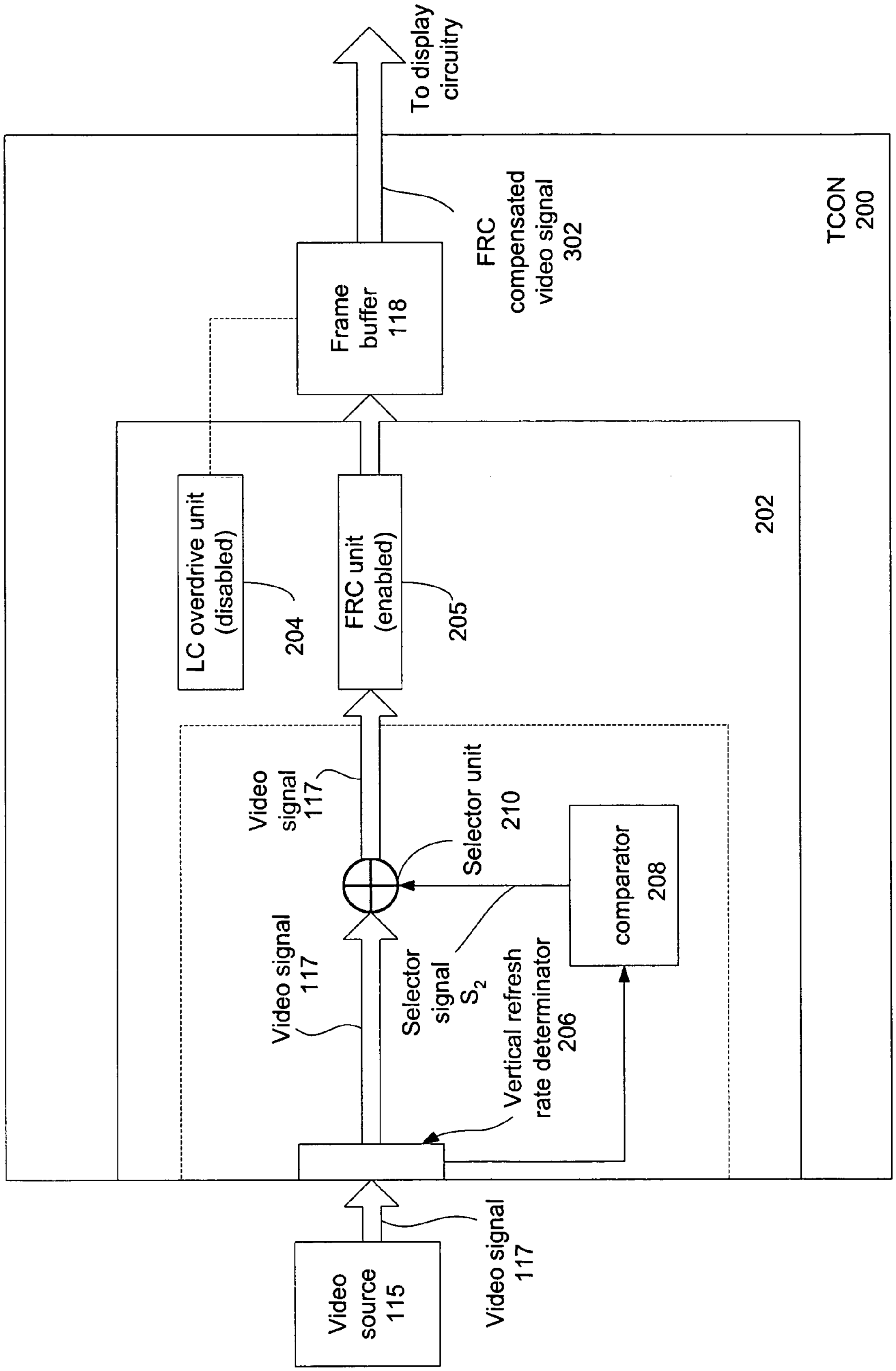

FIGS. 2 and 3 show a representative timing controller (TCON) 200 having a compensation circuit 202 that provides either LC pixel overdrive compensation or FRC compensation in accordance with an embodiment of the invention. It should be noted that the TCON 200 is one specific implementation of the TCON 112 shown and described in FIG. 1 and should therefore is exemplary in nature and should not be construed to limit either the scope or intent of the invention. As shown, the TCON 200 includes (or is coupled to) the frame buffer 118 that is, in turn, coupled to the compensation circuit 202. In the described embodiment, the frame buffer 118 is arranged to provide the requisite memory resources for the proper execution of the selected one of the compensation protocols that, in this example, includes a LC pixel overdrive protocol provided by a LC pixel overdrive unit 204 (when enabled) and a frame rate conversion provided by a FRC protocol unit 205 (when enabled). It should be noted that even though units 204 and 205 are coupled to the frame buffer 118, only one of the protocol providing units 204 or 205 is enabled at a time thereby conserving the amount of memory resources represented by the frame buffer 118.

When operational, the native vertical refresh rate is determined by a vertical refresh rate determination unit 206 coupled to a comparator unit 208. The comparator unit 208 compares the native vertical refresh rate to a predetermined threshold value (which hereinafter will be assumed to be approximately 60 Hz for sake of clarity only) and based upon the comparison provides a selector signal $S_1$ to a selector unit 210 that causes the FRC unit 205 to disable, the LC pixel overdrive unit 204 to enable and the switch unit 210 to direct the incoming video data stream 117 to the LC pixel overdrive unit 204. When the native vertical refresh rate is less than 60 Hz and the FRC unit 205 is disabled, the incoming video stream 117 is directed only to the LC pixel overdrive unit 204. The LC pixel overdrive unit 204 in conjunction with the frame buffer 118 then provides an LC pixel overdrive compensated video signal 212 to the LCD panel display circuitry.

Alternatively (as shown in FIG. 3), when the native vertical refresh rate is greater than 60 Hz (as determined by the vertical refresh rate determinator unit 206), the comparator 208 provides a selector signal $S_2$ that causes the FRC unit 205 to enable, the LC pixel overdrive unit 204 to disable and the switch unit 210 to direct the incoming video data stream 117 to the FRC unit 205. The FRC unit 205 in combination with the frame buffer 118 provides the requisite frame rate conversion (in this case reducing it to that capable of being supported by the display 100) to the incoming video data stream that is, in turn, provided to the display circuitry (i.e., FRC compensated video signal 302). For example, when one of every five input frames is dropped, then the LCD panel display vertical refresh rate is reduced from the native vertical refresh rate by 20%.

Figure 4:
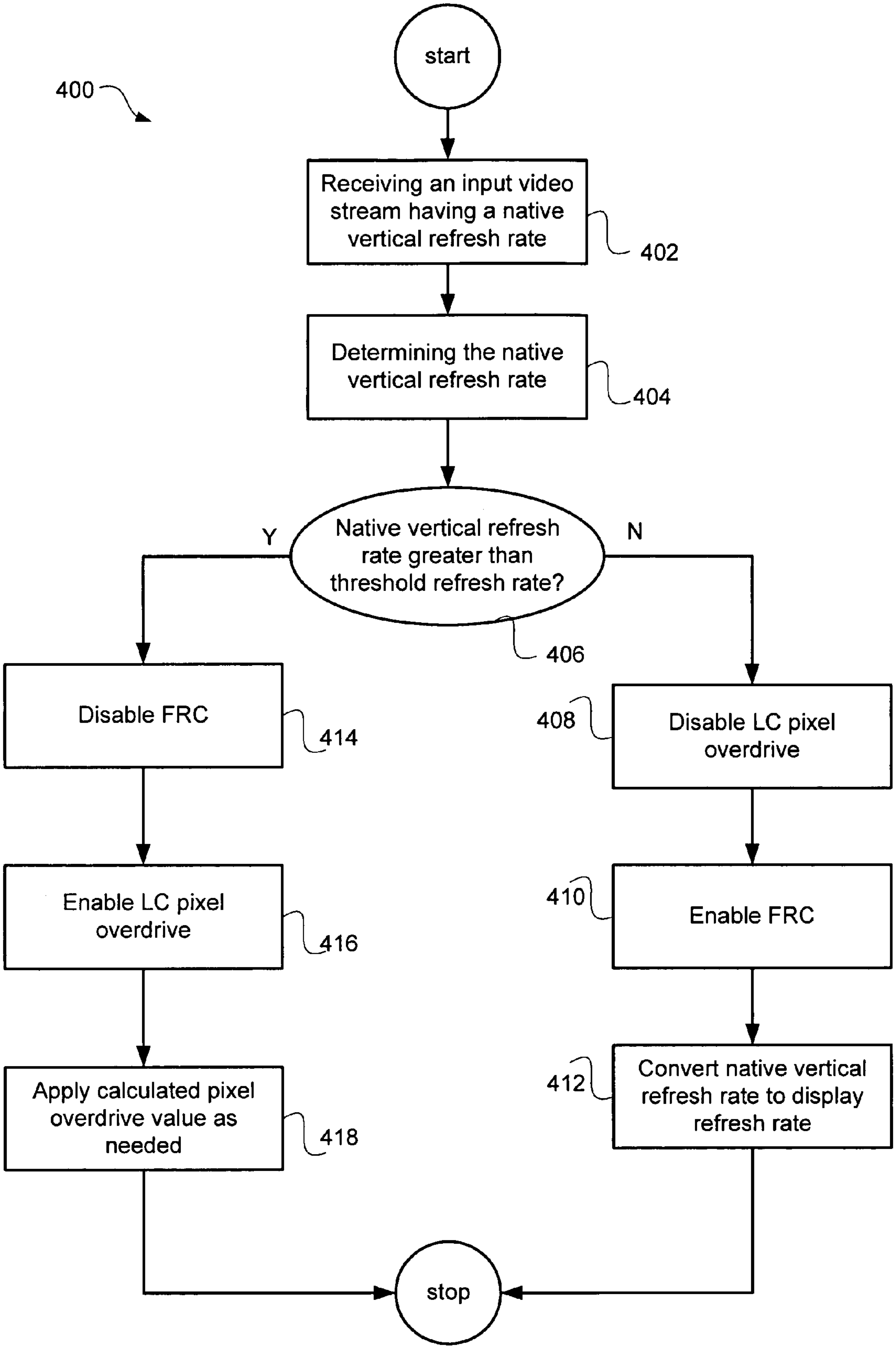
FIG. 4 shows a flowchart detailing a process for dynamically selecting either frame rate conversion (FRC) or pixel overdrive in a liquid crystal based display panel in accordance with an embodiment of the invention.

FIG. 4 shows a flowchart detailing a process 400 for dynamically selecting either frame rate conversion (FRC) or pixel overdrive in a liquid crystal based display panel in accordance with an embodiment of the invention. The process 400 begins at 402 by receiving an input video stream and at 404 by determining the native vertical refresh rate of the incoming video stream. At 406, a comparison of the native vertical refresh rate is made to a predetermined threshold value that is based upon the performance characteristics of the display unit. If it has been determined that the native vertical refresh rate is greater than the predetermined threshold value, then at 408 an LC pixel overdrive capability is disabled and at 410 frame rate conversion (FRC) is enabled. Next, at 412, the native vertical refresh rate is converted to display refresh rate using the enabled FRC.

Alternatively, if it had been determined at 406 that the native vertical refresh rate is less than or equal to the predetermined threshold value, then at 414 the LC pixel overdrive capability is enabled and the FRC capability being disabled at 416. Next, at 418, a calculated pixel overdrive value is applied as needed in order to compensate for motion artifacts induced by the slow LC response time.

Figure 5:
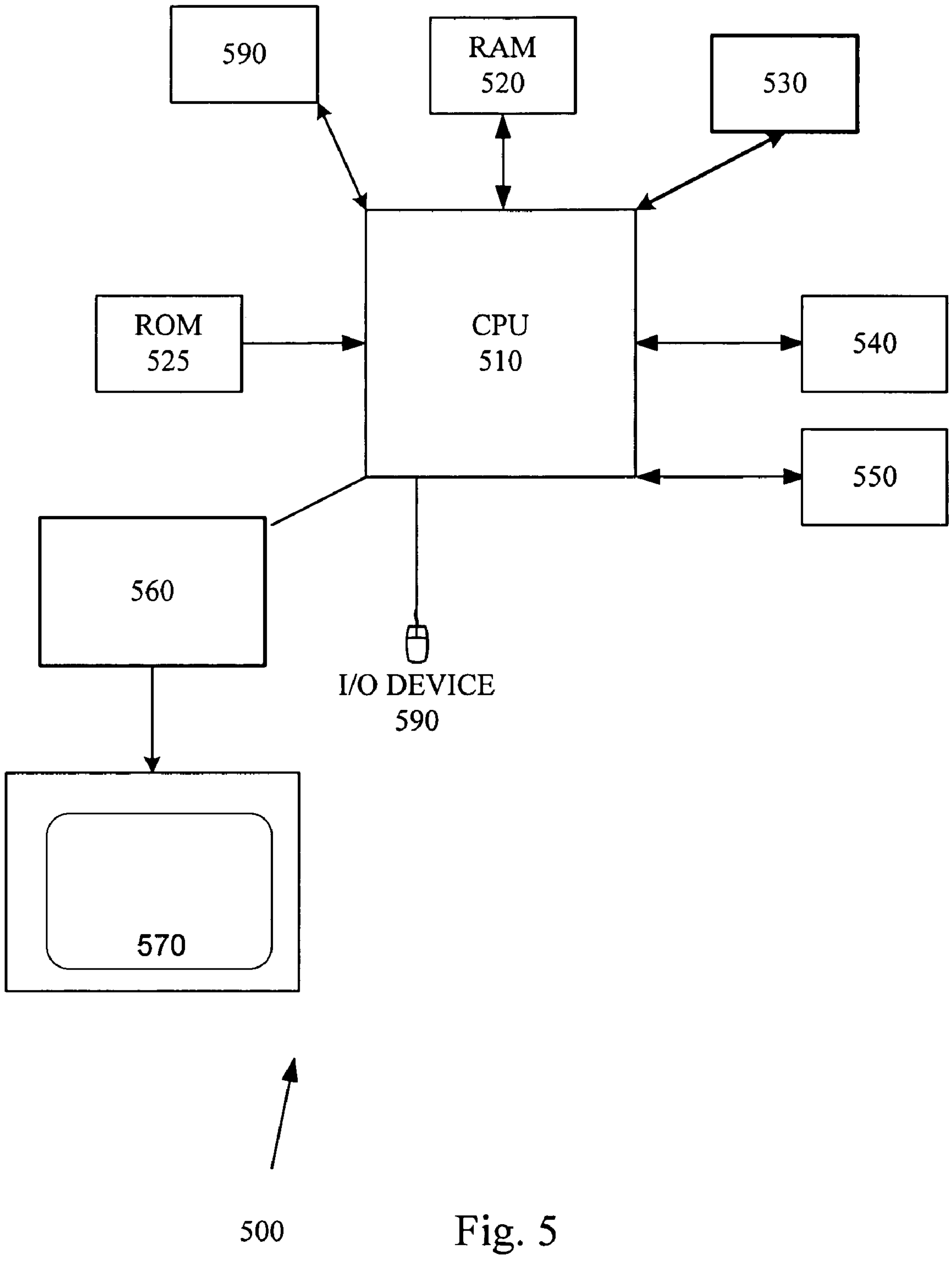
FIG. 5 illustrates a system employed to implement the invention.

FIG. 5 illustrates a system 500 employed to implement the invention. Computer system 500 is only an example of a graphics system in which the present invention can be implemented. System 500 includes central processing unit (CPU) 510, random access memory (RAM) 520, read only memory (ROM) 525, one or more peripherals 530, graphics controller 560, primary storage devices 540 and 550, and digital display unit 570. CPUs 510 are also coupled to one or more input/output devices 590 that may include, but are not limited to, devices such as, track balls, mice, keyboards, microphones, touch-sensitive displays, transducer card readers, magnetic or paper tape readers, tablets, styluses, voice or handwriting recognizers, or other well-known input devices such as, of course, other computers. Graphics controller 560 generates analog image data and a corresponding reference signal, and provides both to digital display unit 570. The analog image data can be generated, for example, based on pixel data received from CPU 510 or from an external encode (not shown). In one embodiment, the analog image data is provided in RGB format and the reference signal includes the $V_{SYNC}$ and $H_{SYNC}$ signals well known in the art. However, it should be understood that the present invention can be implemented with analog image, data and/or reference signals in other formats. For example, analog image data can include video signal data also with a corresponding time reference signal.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

While this invention has been described in terms of a preferred embodiment, there are alterations, permutations, and equivalents that fall within the scope of this invention.

It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. In a liquid crystal display (LCD) panel based display having a memory resource suitable for storing video data, a method of dynamically selecting only one of a number of video data stream conditioning protocols at a time thereby conserving an associated memory resource, comprising:

determining a vertical refresh rate of an incoming video data stream;

selecting only one video data stream conditioning protocol from a number of available video data stream conditioning protocols based upon the determining; and applying only the selected video data stream conditioning protocol to the incoming video data stream using the memory resource to store appropriate video data therein.

2. A method as recited in claim 1, wherein the video data stream conditioning protocols include a frame rate conversion protocol and a liquid crystal (LC) overdrive protocol.

3. A method as recited in claim 2, wherein the frame rate conversion protocol is a frame rate reduction protocol arranged to reduce a native frame rate to a display frame rate.

4. A method as recited in claim 3, further comprising:

when the video vertical refresh rate is greater than a threshold value, then selecting only the frame rate conversion protocol; and reducing the incoming video vertical refresh rate to a desired vertical refresh rate.

5. A method as recited in claim 4, further comprising:

when the video vertical refresh rate is less than or equal to the threshold value, then selecting only the LC pixel overdrive protocol.

6. A method as recited in claim 1, wherein the memory resource is a frame buffer.

7. An apparatus for dynamically selecting only one of a number of video data stream conditioning protocols used to condition an incoming video data stream provided by a video source, comprising:

a video refresh rate determinator unit coupled to the video source arranged to determine a native vertical refresh rate of the incoming video data stream;

a selector unit coupled to the video refresh rate determinator unit arranged to select the only one video data stream conditioning protocol based upon the native vertical refresh rate; and a number of video data stream conditioning protocol units coupled to the selector unit, wherein only a video data stream conditioning protocol unit associated with the selected video data stream conditioning protocol is enabled; and a memory resource coupled to each of the video data stream conditioning protocol units that is used to store video data used to implement the selected video data stream conditioning protocol having a size and speed commensurate with providing the requisite memory resources for the selected video data stream conditioning protocol.

8. An apparatus as recited in claim 7, wherein the apparatus is incorporated into a liquid crystal (LC) display device.

9. An apparatus as recited in claim 8, wherein the number of video data stream conditioning protocols includes a frame rate conversion protocol and a LC pixel overdrive protocol.

10. An apparatus as recited in claim 7, wherein the memory resource is a frame buffer suitably arranged to store video data suitable for a single video frame.

11. An apparatus as recited in claim 9, wherein the frame rate conversion protocol is a frame rate reduction protocol arranged to reduce a native frame rate to a display frame rate.

12. An apparatus as recited in claim 11, wherein when the video vertical refresh rate is greater than a threshold value, then only the frame rate conversion protocol is selected, and the native video vertical refresh rate is reduced to a desired vertical refresh rate.

13. An apparatus as recited in claim 12, wherein when the native video vertical refresh rate is less than or equal to the threshold value, then only the LC pixel overdrive protocol is selected.

14. Computer program product for dynamically selecting only one of a number of video data stream conditioning protocols at a time thereby conserving an associated memory resource in a liquid crystal display (LCD) panel based display having a memory resource suitable for storing video data, comprising:

computer code for determining a vertical refresh rate of an incoming video data stream;

computer code for selecting only one video data stream conditioning protocol from a number of available video data stream conditioning protocols based upon the determining;

computer code for storing video data associated with the selected video data stream conditioning protocol in the memory resource;

computer code for implementing the selected video data stream conditioning protocol; and computer readable medium for storing the computer code.

15. Computer program product as recited in claim 14, wherein the video data stream conditioning protocols include a frame rate conversion protocol and a liquid crystal (LC) overdrive protocol.

16. Computer program product as recited in claim 15, wherein the frame rate conversion protocol is a frame rate reduction protocol arranged to reduce a native frame rate to a display frame rate.

17. Computer program product as recited in claim 16, further comprising:

when the video vertical refresh rate is greater than a threshold value, then selecting only the frame rate conversion protocol; and reducing the incoming video vertical refresh rate to a desired vertical refresh rate.

18. Computer program product as recited in claim 16, further comprising:

when the video vertical refresh rate is less than or equal to the threshold, then selecting only the LC pixel overdrive protocol.

19. Computer program product as recited in claim 14, wherein the memory resource is a frame buffer.

* * * * *